(12) United States Patent
Hwang

(10) Patent No.: US 6,439,490 B1
(45) Date of Patent: Aug. 27, 2002

(54) WIRE REELER

(76) Inventor: Lih-Jiuan Hwang, P.O. Box no. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/514,592

(22) Filed: Feb. 28, 2000

(51) Int. Cl.[7] .................... B65H 75/40; B65H 75/44; B65H 75/48

(52) U.S. Cl. ............... 242/378.1; 242/373; 242/385.3; 191/12.4

(58) Field of Search ............ 242/378.1, 378.2, 242/378.3, 373, 385.1, 385.3; 191/12.2 R, 12.4

(56) References Cited

U.S. PATENT DOCUMENTS

| | | | | |
|---|---|---|---|---|
| 585,778 A | * | 7/1897 | McLeod | 242/378.3 |
| 2,514,628 A | * | 7/1950 | Cortes | 191/12.4 |
| 2,926,865 A | * | 3/1960 | Humphreys | 242/378.3 |
| 3,208,121 A | * | 9/1965 | Price | 242/388.1 |
| 3,834,645 A | * | 9/1974 | Morishige | 242/385.3 |
| 4,165,053 A | * | 8/1979 | Konig | 242/378.3 |
| 4,417,703 A | * | 11/1983 | Weinhold | 242/378.3 |
| 4,653,833 A | * | 3/1987 | Czubernat et al. | 439/528 |
| 4,901,938 A | * | 2/1990 | Cantley et al. | 242/378.1 |
| 5,104,056 A | * | 4/1992 | Jannotta et al. | 242/373 |
| 5,114,091 A | * | 5/1992 | Peterson et al. | 242/378.3 |
| 5,544,836 A | * | 8/1996 | Pera | 242/372 |
| 5,588,626 A | * | 12/1996 | Yang | 242/378.1 |
| 6,019,198 A | * | 2/2000 | Nielsen | 188/31 |
| 6,019,304 A | * | 2/2000 | Skowronski et al. | 242/373 |
| 6,056,591 A | * | 5/2000 | Liao | 439/501 |
| 6,079,657 A | * | 6/2000 | Hwang | 242/388.1 |
| 6,199,784 B1 | * | 3/2001 | Wang et al. | 242/378 |
| 6,250,578 B1 | * | 6/2001 | Manda | 242/378.1 |
| 6,254,025 B1 | * | 7/2001 | Liao | 242/378.1 |
| 6,305,632 B1 | * | 10/2001 | Hwang | 242/378.1 |
| 6,371,398 B1 | * | 4/2002 | Liao | 242/378.1 |

* cited by examiner

*Primary Examiner*—Donald P. Walsh
*Assistant Examiner*—Daniel K Schlak
(74) *Attorney, Agent, or Firm*—Troxell Law Office PLLC

(57) ABSTRACT

A wire reeler enables the auto collection of communication wire, and has a wire collector, an elastic element, and a switch inside a shell body. The wire collector has one end of the communication wire wound on the rotation axle, while another end is wound on the axial column of the wire collector, which axial column is pivotally connected with the switch. The bottom end of the wire collector is engaged with the elastic element. The communication wire will be collected in order without twisting, and the users can take it out easily by pulling or reel it back in automatically.

1 Claim, 6 Drawing Sheets

WIRE REELER

BACKGROUND OF THE INVENTION

1) Field of the Invention

A wire reeler which is suitable for the reeling and putting in order of the communication wire, and which enables the wire to be put in order by means of the reeling and collecting by the reeler. The wire reeler enables users to pull it easily for utilization or collect it automatically to make reeling and collecting easy and convenient.

2) Description of the Prior Art

Usually, the communication wire which extends form the wire box to the telephone set is usually unfixed, and its length is usually made to cope with the length required by the users at the time of moving the telephone. This allows the wire to be loosely placed in a space in between the wire box and the telephone set, which easily causes damage to children and the old people when they trip over the wire. As the wire which lies on the ground is exposed indoors, it brings ill effect to the visual appearance in a house with fine decorations.

In addition, due to the rapid development of the current information industry, the internet has become a most essential source of information. A modem is used by a computer to connect with a network through a communication wire of a fixed length that connects with a telephone wirebox. Excessive length of the communication wire is usually connected and tied in a bundle with the other computer wires and kept at the rear side of the computer. This causes a disorderly appearance.

SUMMARY OF THE INVENTION

The main objective of the present invention is to provide a wire reeler, having a wire collector, an elastic element, a stopper switch and other component members within a shell body. The wire collector is formed by an upper collector body and a lower collector body coupled together to enable the lower end of the information source wire to wind onto an annular wall of a space formed between the upper and the lower collector body. The other end is wound on a jack post on the surface of the upper collector body. The bottom end of the lower collector body is fixed with an elastic element. In this way, the communication wire can be orderly collected to make the operation easy and convenient.

The secondary objective of the present invention is to provide a wire reeler, in which the elastic element is a torsion spring, having one end coupled with the reeler, while another end is rolled on a fixing disc. Pulling the information source wire to rotate the wire collector, winds the torsion spring around the bottom end of wire collector to produce a shrinkage and rolling force to enable the communication wire to be easily pulled out or to be collected automatically.

DETAILED DESCRIPTION OF THE PREFERRED EMBODIMENT

Figure 1:
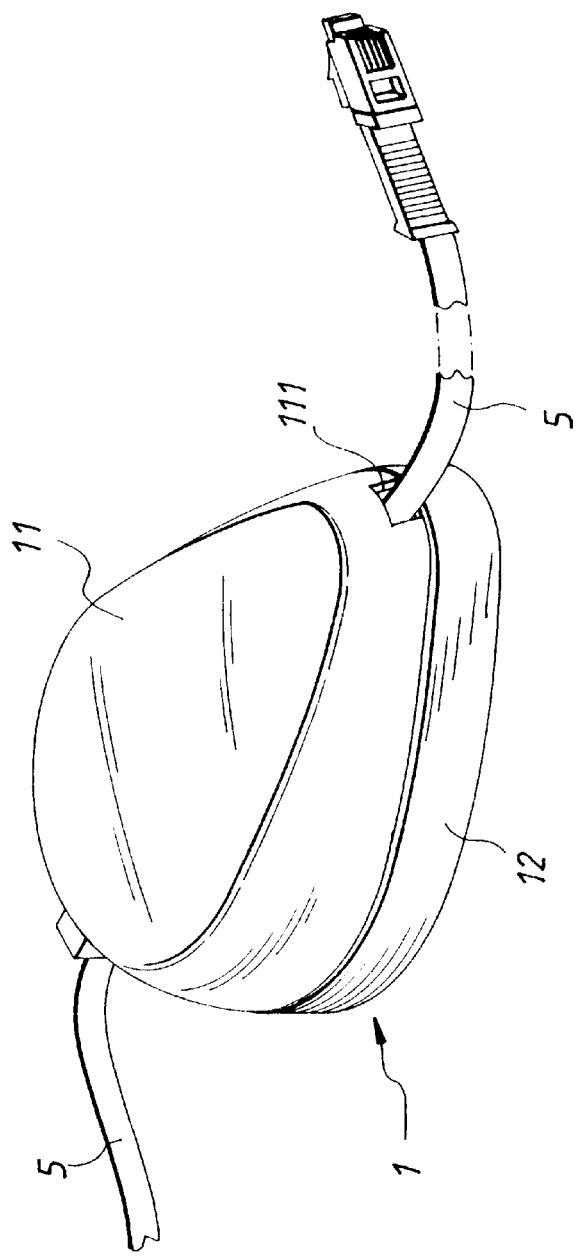
FIG. 1 is a perspective view of the present invention.
Figure 2:
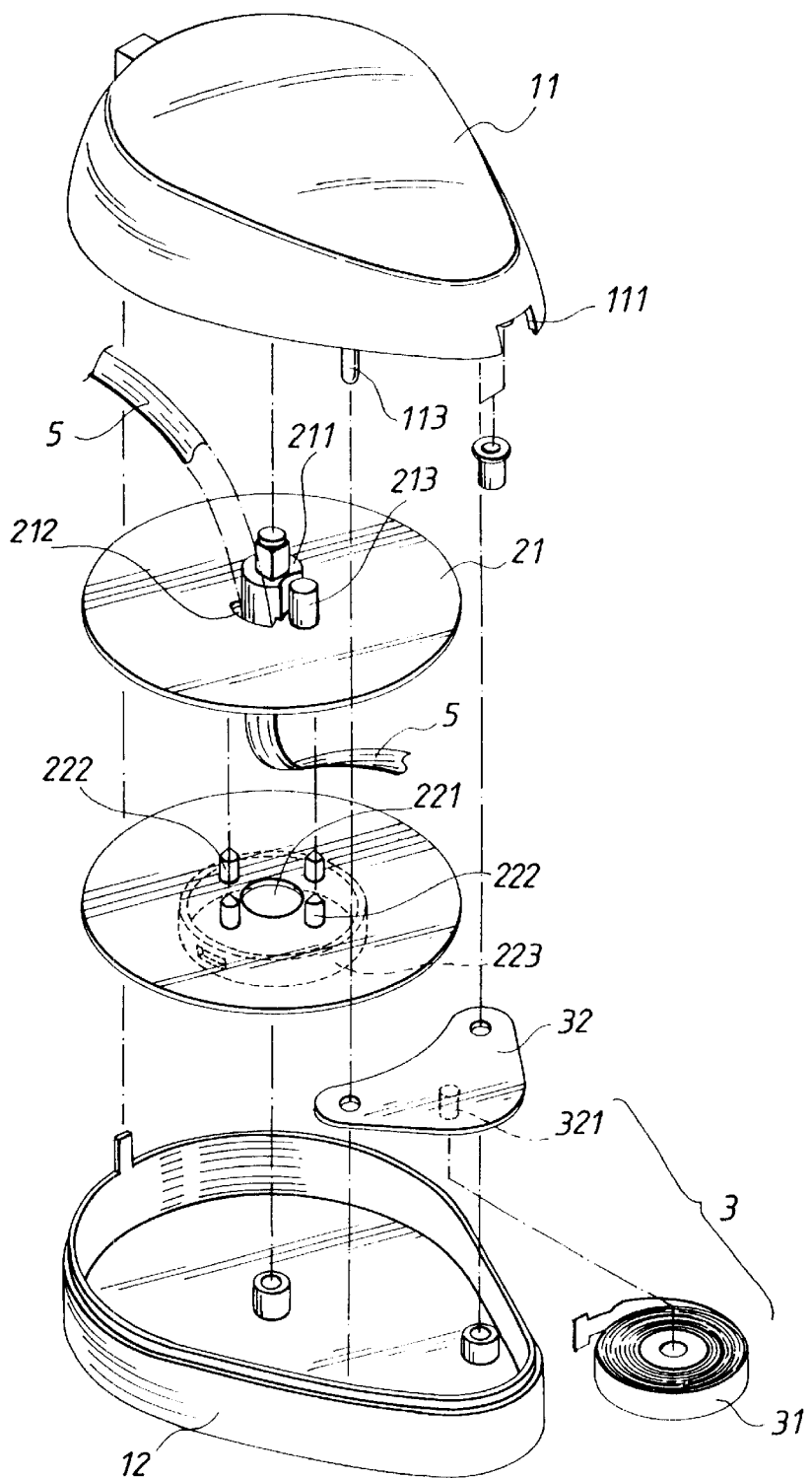
FIG. 2 is an exploded perspective view of the present invention.
Figure 3:
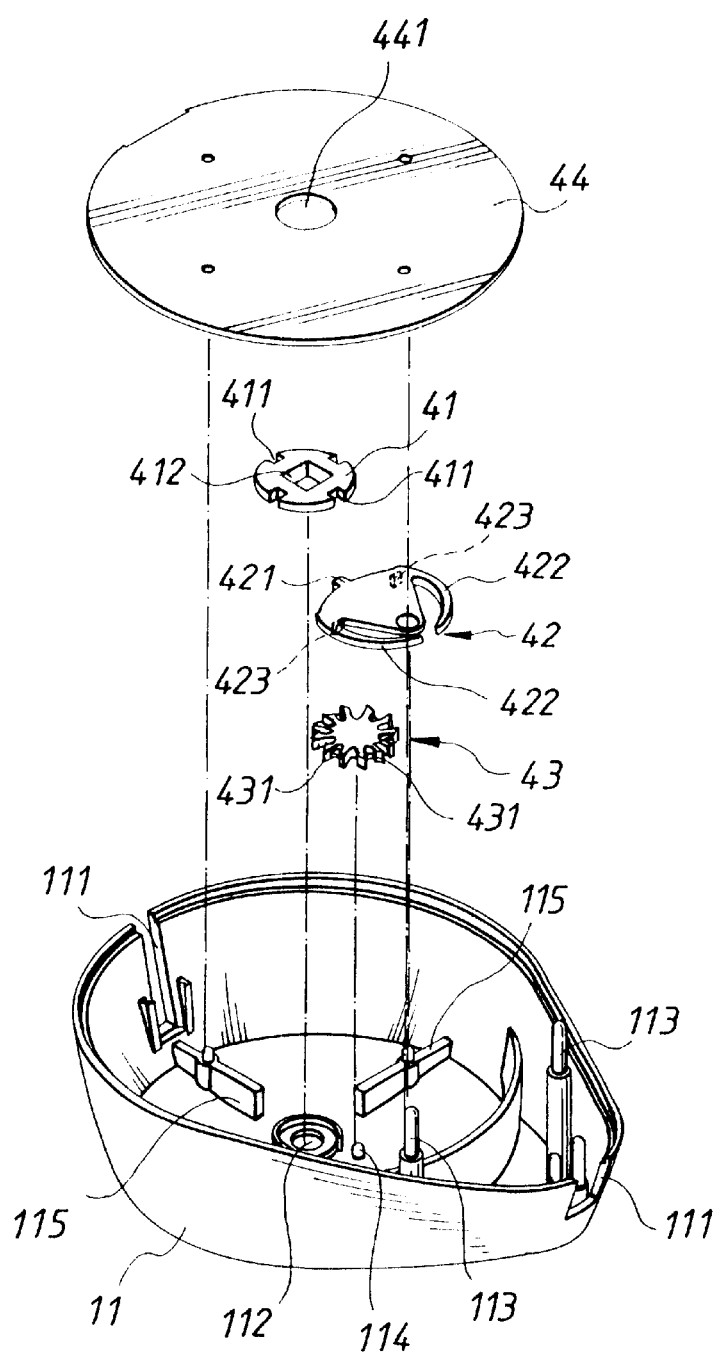
FIG. 3 is an exploded perspective view of the switch assembly of the present invention.
Figure 4:
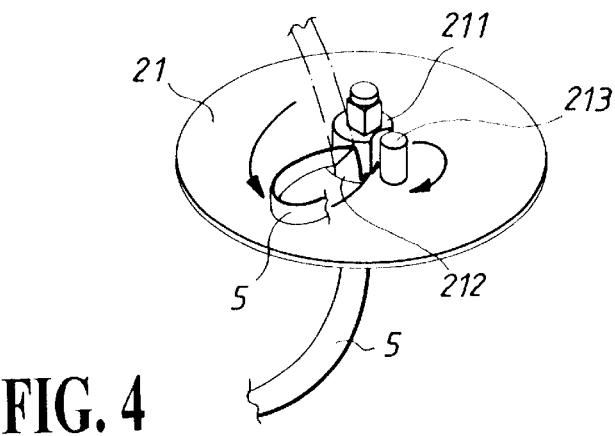
FIG. 4 is a schematic drawing illustrating the winding motion of the present invention.
Figure 5:
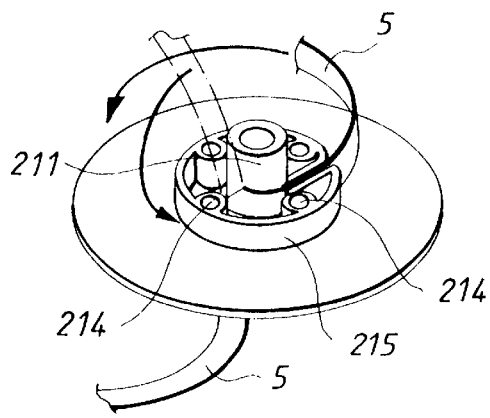
FIG. 5 is a schematic drawing illustrating the winding motion of the present invention winding the communication wire on the annular wall.

As illustrated in FIGS. 1 to 3, the wire reeler of the present invention comprises a shell body 1, in which there is a wire collector 2, a spring element 3, a switch and other assembling members to enable the communication wire 5 to be subject to a moderate shrinkage force by means of the torsion spring 3 to roll and collect the wire onto wire collector 2.

A shell body 1, which is formed by coupling an upper shell body 11 with a lower shell body 12, has a slot 111 at each of the front and rear side of upper shell body 11, an annular groove 112 at the center of its interior, and a coupling column 113 set at a selected spot. Several positioning columns 114 are located at the periphery of annular groove 112, and several supporting ribs 115 are set in the outer periphery.

A wire collector 2 is formed by coupling an upper body 21 with a lower body 22, to form space 23 between the upper body 21 and the lower body 22. At the center of upper body 21 there is a jack post 211 and through hole 212 to enable jack post 211 to pass through and extend from the upper and lower surfaces of upper body 21. A circular column 213 is located at the side of jack post 211 on the upper surface of upper body 21. Several buckling holes 214 and annular wall 215 are located at the bottom surface of upper body 21. Axial hole 221 is located at the center of the lower body 22, and at the periphery of axial hole 221 are a plurality of coupling columns 222 corresponding to buckling holes 214. At the bottom end of lower body 22 there is an annular rib 223, having a long slot 2231. Jack post 221 of upper body 21 passes through axial hole 221, so as to enable the engagement of coupling columns 222 into buckling holes 214 to form wire collector 2.

Elastic element 3 comprises torsion spring 31 with one end coupled to long slot 2231 at the lower direction of wire collector 2, and pivotally mounted on pivot axle 321 of fixing disc 32. Fixing disc 32 engages coupling columns 113 to secure a firm position.

The switch comprises a transmission roller 41, an oscillatory piece 42, and a ratchet wheel 43, and by means of a partition board 44 set on supporting ribs 115 is positioned on the interior side of upper shell body 11 (as indicated in FIG. 3). Transmission wheel 41 is placed in annular groove 112, with several openings 411 at the periphery of the wheel, and a rectangular through hole 412 at the core of the wheel. Oscillatory piece 42 is pivotally set on a positioning column 114 of upper shell body 11, with convexed edge in front direction, and an arc-shape spring piece 422 extending in a backward direction from its upper and lower ends. Upper and lower stopper studs 423 are located on the bottom of the base of spring piece 422. Ratchet wheel 43 is located on another positioning column 114. There is a through hole 441 in the center of partition board 44.

Communication wire 5 passes through hole 212 of upper body 21, and, at the same time, one of its ends is wound on axial column 211 on the upper surface of upper body 21, while another end is wound on annular wall 215.

Figure 6:
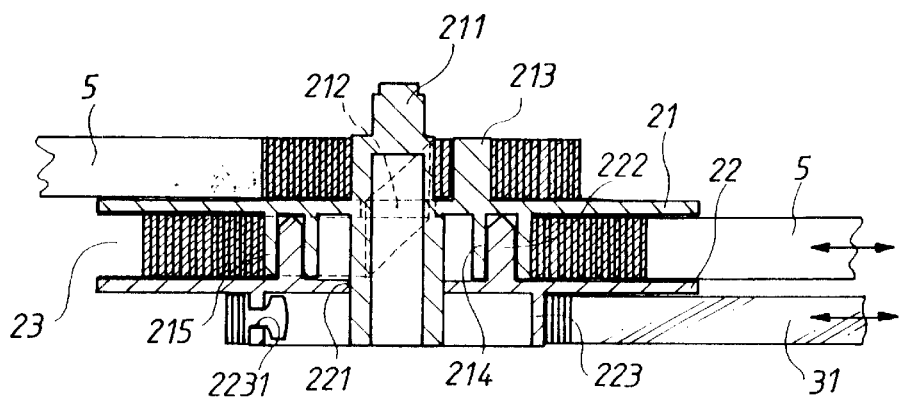
FIG. 6 is a sectional drawing illustrating the utilization of wire collector disc of the present invention.
Figure 7:
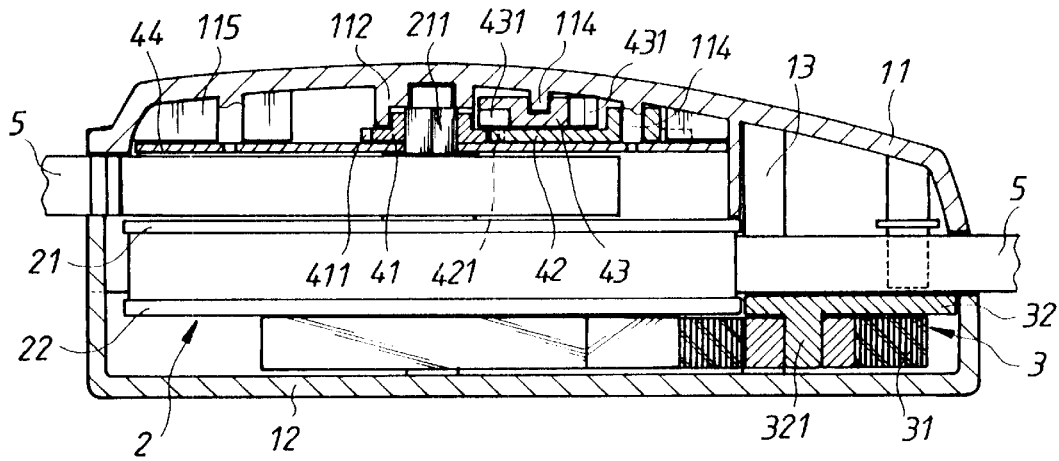
FIG. 7 is a sectional drawings of the present invention.

By utilizing the above-mentioned component members, as indicated in FIGS. 6 and 7, wire collector 2 and communication wire 5 become integrally formed by means of winding beforehand. Then the switch, wire collector 2 and elastic element 3 are assembled in the interior of shell body 1 to enable axial column 211 of upper body 21 to pass through hole 441 of partition board 44, and into through hole 412 of transmission wheel 41. Two end portions of communication wire 5 pass through the front and rear slots 111. Communication wire 5 is wound on wire collector 2 and may be pulled out from front slot 111 to whatever length the users would like to have. Retraction of the wire collector 2 is stopped by the stopping function of the switch. When a slight pulling force is being exerted to communication wire 5, switch will be activated to release the wire collector 2, and thus enable wire collector 2 to conduct a counter-direction rotation by means of the elastic force caused by elastic element 3. This causes communication wire 5 to resume its original position. In so doing, the communication wire will be collected and put in order by means of the reeler, and its operation will be easy and convenient.

In addition, the operational motion of the switch is described below.

Figure 8:
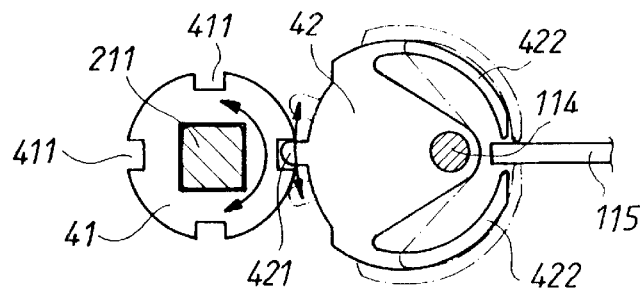
FIG. 8 is a schematic drawing illustrating the motion of the transmission wheel and the oscillatory piece of the present invention.

When communication wire 5 is being outwardly extended, it causes axial column 211 of wire collector 2 to rotate transmission wheel 41. Rotation of transmission wheel 41 will, by means of the openings 421 on the circumference activate convexed piece 421 of oscillatory piece 42 causing oscillatory piece 42 to oscillate towards one side, and spring piece 422 will press against supporting rib 115 to enable oscillatory piece 42 to move back to its original position (as indicated in FIG. 8). At this time, upper stopper stud 423 locate at the bottom end of oscillatory piece 42 and, because its length is shorter than that of lower stopper stud 423, be able to be fully engaged with a full or half notch 431, so as to further enable convexed piece 421 to complete disengage stopper opening 411, to enable wire collector 2 to conduct continuous wire releasing by way of rotation.

Figures 9, 10:
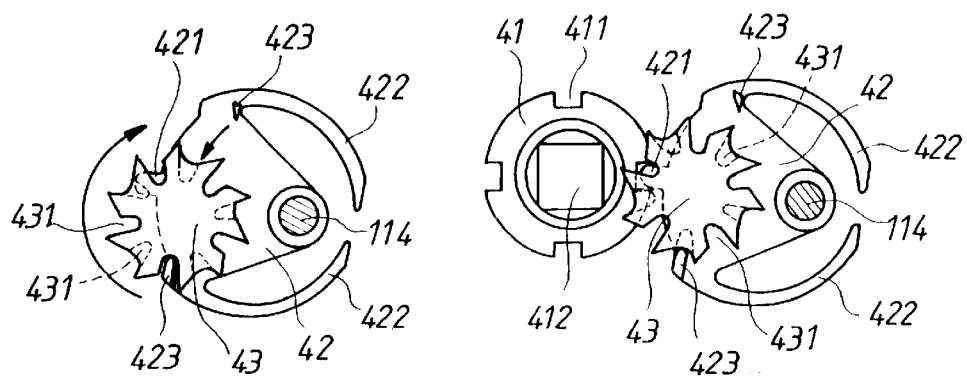
FIG. 9 is a schematic drawing illustrating the motion between the oscillatory piece and the ratchet wheel.
FIG. 10 is another schematic drawing illustrating the motion between the oscillatory piece and the ratchet wheel.
Figure 11:
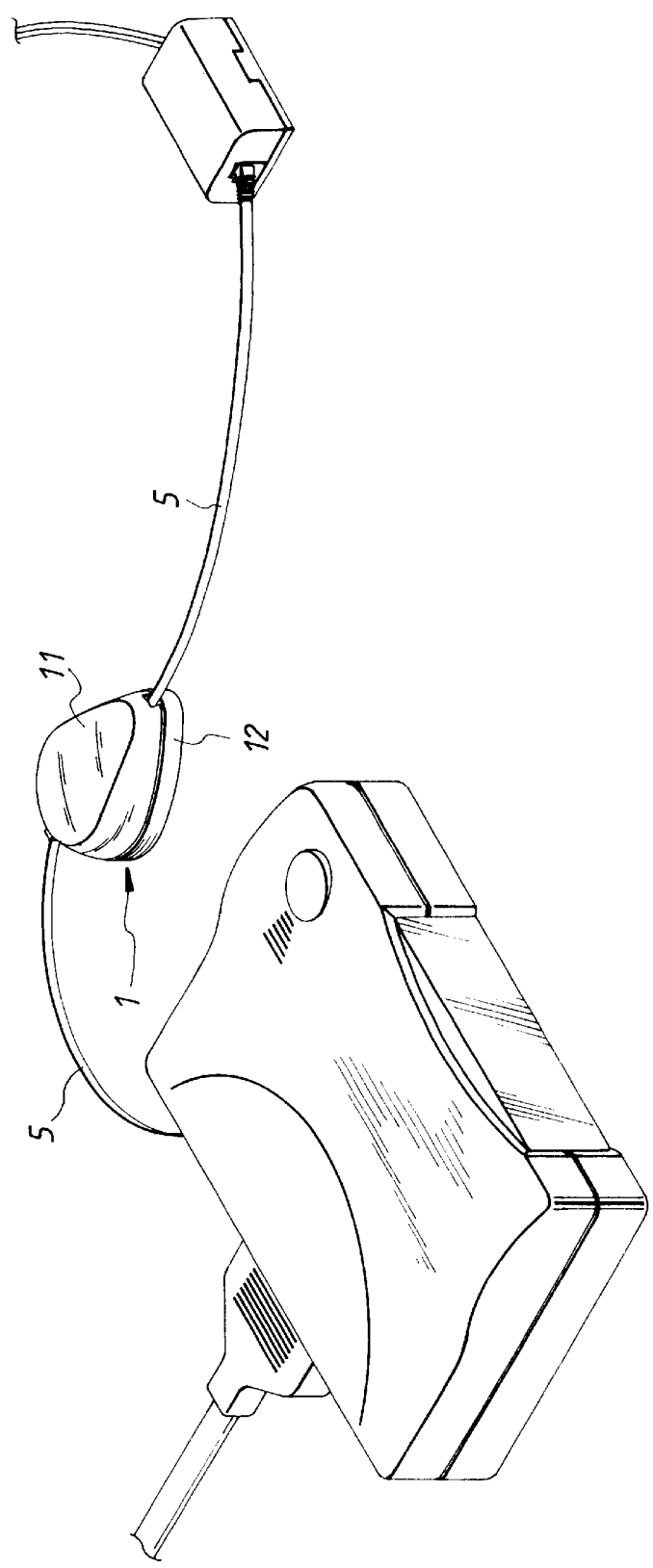
FIG. 11 is a perspective view illustrating the application of the present invention on a data modem.

When wire releasing is being stopped, wire collector 2 will, as affected by the shrinkage force functioned by elastic element 3, conduct a reverse rotation, and will also enable axial column 211 to activate transmission wheel 41 to conduct the same reverse rotation. Oscillatory piece 42 will resume its original position as being driven by the force exerted by spring piece 422, so as to enable convexed piece 421 to engage with opening 411 for a second time. As a result of the continuous counter-direction rotation of transmission wheel 41, convexed piece 421 will oscillate when being moved by opening 411. However, as lower stopper stud 423 is in engagement with the half notch 431 of ratchet wheel 43, the convexed piece 421 of oscillatory piece 42 cannot disengage from opening 411. Thus, the switch remains in a stopping situation causing wire collector 2 to stop its reverse movement (as indicated in FIG. 9).

If communication wire 5 is pulled outwardly for a second time, transmission wheel 41 will be released from being stopped by convexed piece 421. At the same time, ratchet wheel 43 will rotate when being moved by upper stopper study 423 to enable communication wire 5 to be inwardly collected. Lower stopper study 423 will be engaged with the next full-shape ratchet wheel 431 (as indicated in FIG. 10) to enable convexed piece 421 to disengage from opening 411, and move towards one side. This enables transmission wheel 41 to rotate smoothly, so as to enable wire collector 2 to reel in the communication wire 5.

Summarizing the above, it can be seen that the wire reeler presented in the present invention is indeed precise and convenient for the extension and collection of communication wire, and keep it in order.

What is claimed is:

1. A wire reeler comprising:

a) a shell body including first and second shell bodies bounding an interior space, and having front and rear slots communicating with the interior space;

b) a wire collector rotatably mounted in the interior space and including first and second collector bodies attached together and a central jack post passing through the first and second collector bodies, the first collector body having a column extending therefrom adjacent to the central jack post so as to form a space therebetween, the second collector body having an annular rib extending therefrom with a long slot therethrough;

c) a communication wire including a first end portion passing through the first collector body, through the space between the central jack post and the column, wound around the central jack post and the column, and passing out of the shell body through the rear slot, and a second end portion passing out of the shell body through the front slot;

d) an elastic element mounted on the shell body and acting on the wire collector to apply a retracting biasing force to the wire collector whereby the communication wire is wound onto the wire collector; and, e) a stopper switch including:

i) a transmission wheel mounted on the central jack post so as to rotate therewith, the transmission wheel having a plurality of stopper openings at a periphery;

ii) an oscillating piece pivotally mounted on the shell body and having a convexed piece extending therefrom to engage one of the stopper openings, the oscillating piece having opposed spring pieces biasing the oscillating piece toward a central position, and two stopper studs extending from a surface of the oscillating piece; and, iii) a ratchet wheel rotatably located on the shell body, a periphery of the ratchet wheel having a plurality of alternating full and half notches, and located such that when a stopper stud engages one of the half notches, disengagement of the convexed piece from the stopper opening is prevented, thereby preventing retracting rotation of the wire collector.

* * * * *